Jan. 26, 1971 J. T. L. SHARPE 3,559,070
SIGNAL TRANSMITTER FOR LIMITED BAND WIDTH TRANSMISSION SYSTEMS
Filed June 11, 1968
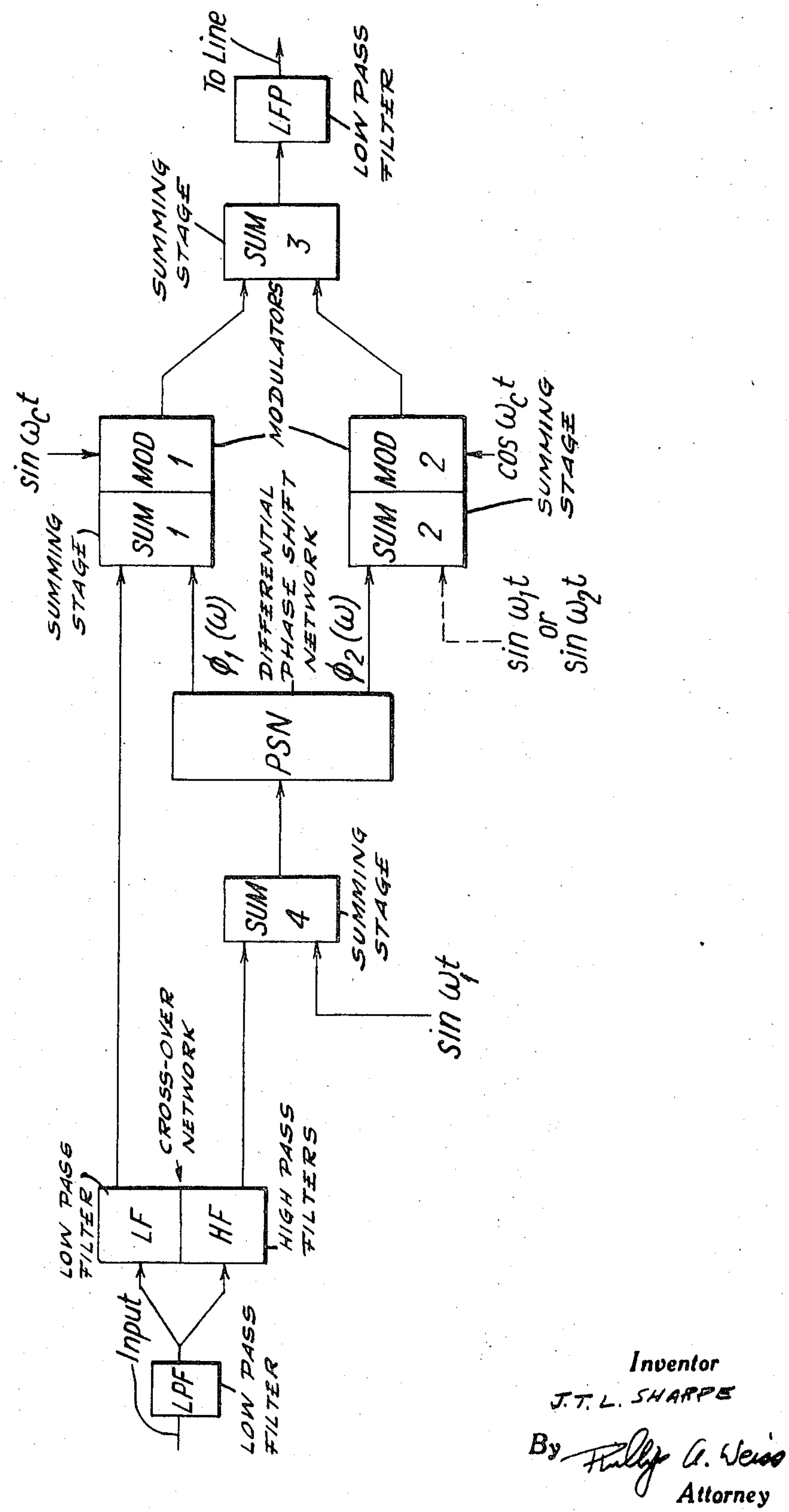
Inventor
J. T. L. SHARPE
By Philip A. Weiss
Attorney

United States Patent Office 3,559,070

Patented Jan. 26, 1971

3,559,070

SIGNAL TRANSMITTER FOR LIMITED BAND WIDTH TRANSMISSION SYSTEMS

John Thomas Lawrence Sharpe, Harlow, England, assignor to International Standard Electric Corporation, New York, N.Y., a corporation of Delaware Filed June 11, 1968, Ser. No. 736,190

Claims priority, application Great Britain, June 30, 1967, 30,285/67

Int. Cl. H04b *1/68, 1/70*

U.S. Cl. 325—136 7 Claims

ABSTRACT OF THE DISCLOSURE

Data transmission systems using carrier modulation for transmitting digital data signals over channels providing limited band widths. Cross-over network means provide high and low frequency components of the input signals. Means are then provided for utilizing the high and low frequency components to modulate carrier signals and transmit the high frequency component as a single side band signal and the low frequency component as a double side band signal, both using the same carrier frequency.

This invention relates to signal transmission systems, and more particularly to data signal transmission systems which involve the transmission of signals with a spectrum extending from zero frequency upwards over channels having a pass band which in practice covers a range of about 300 c./s. to 3000 c./s. Such systems are especially useful for transmitting over telephone networks the digital signals used as the inputs and outputs of modern computers.

The transmission of signals having a spectrum extending down to zero frequency means that some transposition of the input spectrum is required. This is performed by allowing the input signal to modulate a suitable carrier wave. The modulation process usually used results in the generation of two side bands about the carrier frequency so that, the case of amplitude modulation and also phase modulation systems, which are commonly used in data transmission, the signal then occupies twice its former band width. In any system which purports to make efficient use of the available band width, this is obviously a very undesirable effect and the use of any measures which help to overcome it can result in improvements in the effective band width. Such measures can thus increase the speed of transmission by factors of up to 2.

Accordingly, an object of this invention is to provide data transmission systems that efficiently use the available band width.

A related object of this invention is to provide data transmitting systems that effectively cancel one of the double side bands normally generated to thereby more efficiently utilize the available band widths of the pass band channels.

According to this invention, a preferred embodiment of the signal transmission system utilizes a sending or transmitting station which includes means for separating the low and high frequency components of a signal to be transmitted over the system. The station comprises means for deriving two 90° phase shifted versions of the high frequency component. A summation circuit combines the low frequency components and one of the phase shifted versions of the high frequency components.

The combination is used to modulate a first carrier wave in a first modulator. A second carrier wave is modulated in a second modulator with the other phase shifted version of the high frequency components. The first and second carriers have the same frequency and are 90° out of phase with one another. Means are provided for combining the outputs of the two modulators. Filter means are then provided for sending the summed outputs over the transmission media of the system.

In effect the high frequency component of the input signal is transmitted as a single side band signal while the low frequency component is transmitted as a double side band signal. By this means the line signal can be made to approach the double side band condition over a much wider band width with a consequent reduction in the difficulty of extraction of the required carrier phase. Since synchronous detection of a single side band or a double side band signal is performed in exactly the same way, the composite signal can be demodulated with a single demodulator.

One device for achieving the required side band cancellation in the case of the SSB signal is by means of a differential phase-shift network. The required frequency independent phase-shift is facilitated in this way.

In order that the above mentioned and other features and objects of the invention may be more readily understood and practiced, an embodiment of the invention will be described with reference to the accompanying drawing which illustrates in block diagram form the essential parts of a transmitting station handling wide spectrum input signals.

In the arrangement shown in the drawing, the input signal is first passed through a premodulation low-pass filter to remove frequencies higher than those required by the intelligence content, i.e. the low-pass filter cut-off frequency is not low enough to degrade the intelligence content of the high frequency components.

The signal is then applied to a cross-over network comprising a low-pass filter LF and a high pass filter HF. The filtered high frequency components are then applied to a differential phase shift network PSN, together with a synchronizing tone sin $w_1t$. A typical phase shift network suitable for this purpose is described in "Properties of Some Wide-Band Phase Splitting Networks" by D. G. C. Luck, Proc. I.R.E., vol. 37, No. 2, February 1949, p. 145.

One of the outputs of the phase shift network, $\phi_1(w)$, is then applied to a summing stage SUM 1 where it is summed with the low frequency output derived from filter LF of the cross-over network, and these combined outputs are used to modulate a carrier wave sin $w_ct$ in the modulator MOD 1.

The other output of the phase shift network, $\phi_2(w)$, is used to modulate a second carrier wave cos $w_ct$ in the modulator MOD 2. These two carriers are the same frequency and 90° out of phase with one another. The two modulated carriers are then combined in the network SUM 3 and the combined signals is passed through a post-modulation low-pass filter LFP before being sent to line.

The effect of combining the outputs of MOD 1 and MOD 2 is to cause cancellation of one of the side bands produced by modulation of the two carriers by $\phi_1(w)$ and $\phi_2(w)$ respectively and cooperation of the remaining side bands. The result is a single side band signal containing the low frequency information. If the modulating signal is defined as sin $wt$ and the carrier frequency is $w_c$ then the output of MOD 1 is given by:

$$\sin w_ct. \sin wt. = \tfrac{1}{2} \cos (w_c - w)t. - \tfrac{1}{2} \cos (w_c + w)t \quad (1)$$

and that of modulator MOD 2 by:

$$\cos w_ct. \cos wt = \tfrac{1}{2} \cos (w_c - w)t + \tfrac{1}{2} \cos (w_c + w)t \quad (2)$$

The addition of (1) and (2) results in cancellation of the upper side band and leaves a resultant of:

$$\cos (w_c - w)t$$

Complete cancellation of the unwanted side band down to carrier frequency is impossible with physically available phase shifters. Conventional LCR or CR phase shift networks produce phase shifts that approach zero at zero frequency. Digital phase shifters have an amplitude ripple which causes a similar limitation. If a modulating signal with a spectrum extending down to zero is the input to the above system, then a vestigial side band signal will result. The width of the vestigial side band signal depends upon the low frequency performance of the phase shifter. The shape of the vestigial side band signal depends upon the relationship between phase and frequency of the particular phase shift network used.

By dividing the input signal as described above and generating a composite modulated signal, the line signal can be made to approach the double side band condition over a much wider band width. The line spectra of the composite signal is very similar to that of a vestigial side band signal.

The synchronizing tone, sin $w_1$T, when added to the high frequency component before the phase-shift network PSN will be transmitted as part of the single side band signal. It can be added to output $\phi_2(w)$ instead, as shown in the drawing by the dotted line input to the summing stage SUM 2, or a second synchronizing tone sin $w_2t$ can be added at this point in addition to the first synchronizing tone. In either case, the tone added after the phase-shift network will be transmitted as a double side band signal.

It is to be understood that the foregoing description of specific examples of this invention is made by way of example only and is not to be considered as a limitation on its scope.

I claim:

1. A signal transmitter for transmitting digital data signals comprising:
- an input for signals to be transmitted, said signals having low frequency components and high frequency components,
- cross-over network means coupled to said input to apply said low frequency components to a first signal channel and said high frequency components to a second signal channel,
- phase shift network means coupled to said second channel to provide two 90° phase shifted versions of said high frequency components,
- first modulator means coupled to said first channel and said phase shift means for modulating a first carrier wave with said low frequency components and one of said phase shifted versions of said high frequency components,
- second modulator means coupled to said phase shift means for modulating a second carrier wave with the other of said phase shifted versions of said high frequency components,
- said first and second carriers having the same frequency and being 90° out of phase with one another, and
- combiner means coupled to said first and said second modulator means for combining the outputs of said first and second modulator means to provide an output signal for said transmitter.

2. The system according to claim 1 wherein said phase shift means is a differential phase shift network.

3. The system according to claim 1, further including first means coupled to said second channel prior to said phase shift means for combining a synchronizing tone signal with said high frequency components.

4. The system according to claim 1, further including pre-modulation low pass filter means coupled between said input and said cross-over network means to remove from said high frequency components unwanted signal components having a frequency higher than that which is necessary to transmit.

5. The system according to claim 4, further including first means coupled to said second channel prior to said phase shift means for adding a synchronizing tone to said high frequency components.

6. The system according to claim 4, further including first means coupled between said phase shift means and said second modulator means for adding a synchronizing tone to said other of said phase shifted versions.

7. The system according to claim 4, further including a post-modulation low pass filter coupled to the output of said combiner means to remove from said output signal unwanted high frequency modulation products.

References Cited

UNITED STATES PATENTS

| | | | |
|---|---|---|---|
| 3,229,231 | 1/1966 | Saraga | 325—50 |
| 3,343,093 | 9/1967 | Van Gerwen | 325—60 |
| 3,391,339 | 7/1968 | Lynch | 325—60 |

RICHARD MURRAY, Primary Examiner

A. J. MAYER, Assistant Examiner

U.S. Cl. X.R.

325—137